United States Patent
Bildstein

(10) Patent No.: US 8,286,322 B2
(45) Date of Patent: Oct. 16, 2012

(54) METHOD FOR THE MANUFACTURE OF A CONNECTION BETWEEN A CORRUGATED TUBE AND A FURTHER BODY

(75) Inventor: Markus Bildstein, Oberstaufen (DE)

(73) Assignee: Liebherr-Aerospace Lindenberg GmbH, Lindenberg (DE)

(*) Notice: Subject to any disclaimer, the term of this patent is extended or adjusted under 35 U.S.C. 154(b) by 530 days.

(21) Appl. No.: 12/387,656

(22) Filed: May 6, 2009

(65) Prior Publication Data
US 2009/0276994 A1    Nov. 12, 2009

(30) Foreign Application Priority Data
May 8, 2008  (DE) .................. 10 2008 022 687

(51) Int. Cl.
*B21D 39/04*    (2006.01)
*F16L 9/06*    (2006.01)

(52) U.S. Cl. ............... 29/458; 29/505; 29/520; 138/173

(58) Field of Classification Search .................... 29/458, 29/505, 508, 512, 520, 521, 522.1, 525, 454; 138/173; 72/370.19, 370.2
See application file for complete search history.

(56) References Cited

U.S. PATENT DOCUMENTS

| | | | |
|---|---|---|---|
| 4,907,830 A * | 3/1990 | Sasa et al. ................. 285/91 |
| 6,173,995 B1 | 1/2001 | Mau | |
| 6,378,914 B1 * | 4/2002 | Quaranta .................... 285/256 |
| 2002/0109559 A1 * | 8/2002 | Pitschi ..................... 333/21 R |
| 2004/0177486 A1 * | 9/2004 | Homann .................... 29/458 |

FOREIGN PATENT DOCUMENTS

| | | |
|---|---|---|
| DE | 198 11 994 | 9/1999 |
| WO | 2008/028104 | 3/2008 |

* cited by examiner

*Primary Examiner* — Jermie Cozart
(74) *Attorney, Agent, or Firm* — Dilworth & Barrese, LLP.

(57) ABSTRACT

The present invention relates to a method for the manufacture of a connection between a corrugated tube and a further body, wherein the further body has a bore having a bore diameter which is smaller than the outer diameter of the corrugated tube, with the method including the step of drawing or pressing the corrugated tube into the bore.

17 Claims, 2 Drawing Sheets

PRIOR ART

METHOD FOR THE MANUFACTURE OF A CONNECTION BETWEEN A CORRUGATED TUBE AND A FURTHER BODY

BACKGROUND OF THE INVENTION

The invention relates to a method for the manufacture of a connection between a corrugated tube and a further body.

Cables have to be laid in aircraft for the transfer of data and/or power such that they are protected from mechanical damage, from contamination and from electromagnetic irradiation to ensure an uninterrupted data transmission or a reliable power supply. A corrugated tube made of metal satisfies these requirements provided it is ensured that it can be connected mechanically tightly, in a sealed and electrically conductive manner.

It is known from the prior art to achieve the corrugated tube connection in that the corrugated tube end is compressed and is then clamped using a sleeve nut as is shown in FIG. 2.

A further known method comprises the corrugated tube 20' in accordance with FIG. 3 being connected to the body 10' to be connected by a weld connection or a solder connection 30'.

SUMMARY OF THE INVENTION

It is the underlying object of the present invention to further develop a method of the initially named kind such that a reliable, cost-effective, electrically conductive and space-saving connection of the corrugated tube is made possible.

This object is solved by a method having the features herein.

Provision is made in accordance with the invention that the body to which the corrugated tube is to be connected has a bore with a bore diameter which is smaller than the outer diameter of the corrugated tube, with the method including the step of drawing or pressing the corrugated tube into the bore. At least a part section of the corrugated tube which is to be received in the bore thus has an outer diameter before the drawing in or pressing in which is larger than the inner diameter of the bore.

Provision is preferably made in this respect that the corrugated tube and/or the further body to be connected consist of metal or comprise metal.

Provision is further preferably made that a diameter reduction of the first corrugation of the corrugated tube cut at the crest point takes place before the drawing in or pressing in. This diameter reduction can take place by elongating or stretching the first corrugation of the corrugated tube. Alternatively or additionally, provision can be made that the diameter reduction takes place by cutting off the corrugated tube. Provision is preferably made that only the first corrugation of the corrugated tube is initially stretched out and that it is then cut off in the region of the outwardly directed corrugation peak.

The pressing in of the corrugated tube can take place in that a spreading tool and/or pressing tool is inserted into the inner space of the corrugated tube and that a force acting in the direction of introduction is then exerted onto the spreading tool and/or pressing tool.

The spreading tool or pressing tool can be inserted into the corrugated tube such that it is applied to the inner shoulder of the first non-deformed corrugation.

The corrugated tube is preferably made such that the corrugated tube springs back elastically as soon as force is no longer exerted onto the spreading tool or pressing tool, whereby a friction-locked connection results between the outer side of the corrugated tube and the inner wall of the bore. A good mechanical fixing of the corrugated tube in the bore is already achieved by this compression joint.

The bore can have a bore bottom, with an undercut being located around the peripheral region of the bore bottom and having a larger diameter than the bore per se.

Provision can furthermore be made that a new corrugation is formed by the drawing in or pressing in of the corrugated tube in the end region of the corrugated tubes said corrugation being received at least regionally in the undercut. An axial fixing is achieved in this manner by form fit in addition to the named force-transmitting connection.

The connection between the corrugated tube and the further body is preferably present over the total periphery of the corrugated tube so that a 360° shield against electromagnetic irradiation results.

To achieve a further improved seal tightness and/or further increased mechanical strength, provision can be made that the corrugated tube is provided with a sealing and/or bonding fluid at least in its region to be received in the bore and/or the inner bore wall and/or the bore bottom is/are provided with a sealing and/or bonding fluid.

The invention furthermore relates to an arrangement having a corrugated tube and a body connected thereto, said arrangement characterized in that the connection between the corrugated tube and the body was carried out in accordance with a method described herein. The invention finally relates to an aircraft having at least one arrangement described herein.

BRIEF DESCRIPTION OF THE DRAWINGS

Further details and advantages of the invention will be explained in more detail with reference to an embodiment shown in the drawing.

DESCRIPTION OF THE PREFERRED EMBODIMENTS

Figure 1:
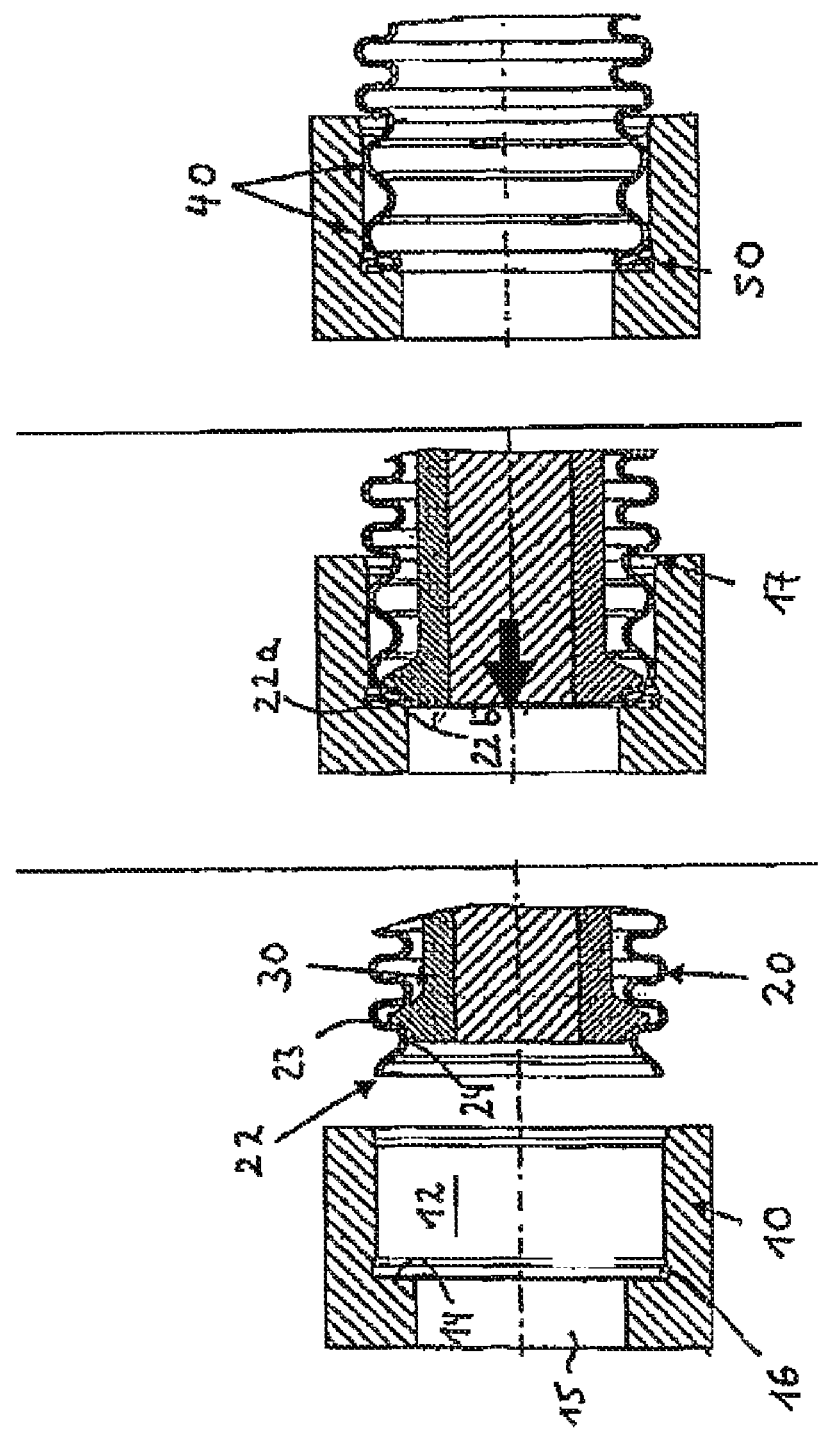
FIG. 1 shows the method steps for the manufacture of the connection between the corrugated tube and the body to be connected thereto in accordance with the present invention.
Figure 2:
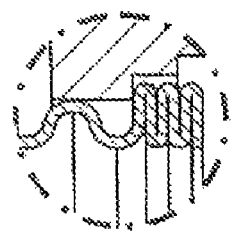
FIG. 2 shows a known method for the corrugated tube connection by clamping by means of a sleeve nut.
Figure 2:
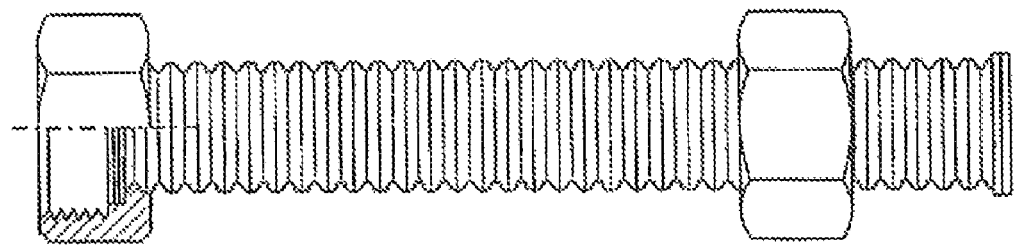
Figure 3:
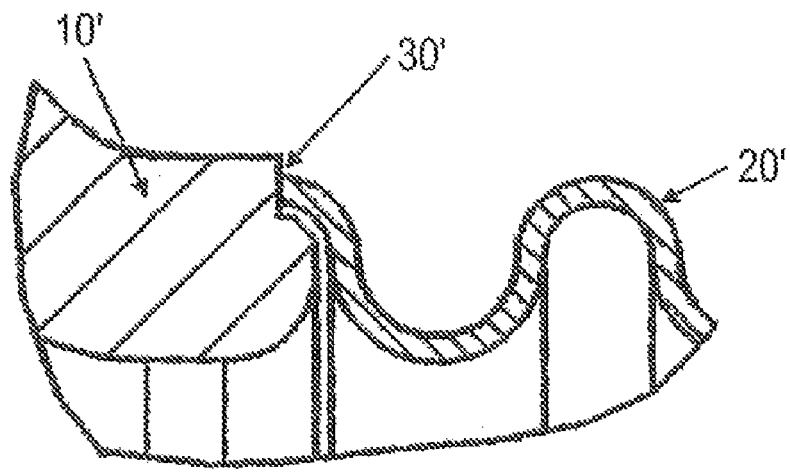
FIG. 3 shows a known method for the corrugated tube connection by welding or soldering.

A metallic body to which the corrugated tube 20 should be connected is shown with the reference numeral 10 in FIG. 1. The body 10 has a bore 12 which comprises a bore bottom 14 which is in turn passed through by a further bore 15 which has a smaller diameter than the bore 12. The bore 12 is enlarged in diameter in its region bounding the bore bottom 14, with the diameter enlargement being formed by a circumferential groove or a recess 16.

The corrugated tube 20 is likewise made of metal and serves for the reception of cables, not shown, for the transfer of data and/or power.

Since the outer diameter of the corrugated tube 20 not drawn into the bore 12 is larger than the inner diameter of the bore 12 of the body 10, in a first step, the end region of the corrugated tube 20 is first deformed such that its outer diameter is somewhat smaller than the inner diameter of the bore 12. This can be done, for example, in that the first corrugation 22 of the corrugated tube 20 is lengthened. i.e. stretched/extended, so that the outer diameter of this corrugation 22 is reduced so much that it is somewhat smaller than the inner diameter of the bore 12. The corrugated tube 20 can then be cut off in the region of this corrugation 22, preferably in its crest region, as is shown in FIG. 1, left hand representation.

Subsequently, a spreading and/or pressing tool 30 is introduced into the interior of the corrugated tube 20 such that the spreading and/or pressing tool 30 contacts the undeformed corrugation 23 adjacent to the deformed corrugation 22 from the inside, as can be seen from FIG. 1, left hand representation. In other words, the spreading and/or pressing tool 30 is laid against the shoulder of the first corrugation trough 24.

The circumferential wall of the bore 12 and/or the bore bottom 14 as well as the corrugations which are probably located in the bore 12 after the drawing in of the corrugated tube are then wetted with a sealing and bonding fluid. In accordance with the embodiment shown in FIG. 1, this applies to the deformed corrugation as well as to the two adjoining, non-deformed corrugations. It is naturally equally possible first to apply the named fluid and then to insert the spreading and/or pressing tool 30.

As can be seen from FIG. 1, middle representation, the corrugated tube 20 is then pressed into the bore 12 of the body 10 by axial force exertion onto the spreading and/or pressing tool. This is indicated by the arrow in FIG. 1, middle representation. This results in a reduction in the diameter of the pressed-in corrugations whose outer sides now contact the inner wall of the bore 12. After the relief of the spreading and/or pressing tool, there is a compression joint between the corrugated tube 20 and the bore 12 of the body 10 due to the springing back of the corrugated tube 20. This is indicated by the reference numeral 40 in FIG. 1, right hand representation.

A chamfered edge of the bore 12 is marked by the reference numeral 17 in FIG. 1, middle representation and facilitates an introduction of the corrugations of the corrugated tube 20 into the bore 12.

As can furthermore be seen from FIG. 1, middle representation, the corrugated tube 20 is pressed so far into the bore 12 until the end section/region 22a as well as a further radially inwardly offset section 22b of the aforesaid first corrugation 22, which is adjacent to the first corrugated trough, adjoins the bore wall or the bore bottom 14, as is shown in FIG. 1, middle representation. In this respect, the corrugated tube 20 is compressed so much that the walls of the first corrugation trough contact one another or only have a comparatively small spacing.

Furthermore, at least the end region 22a of the corrugated tube 20 is received in the recess 16 so that a shape match results in the axial direction between the bore 12 and the reformed first corrugation. This is indicated by the reference numeral 50 in FIG. 1, right hand representation.

After the pressing-in process, the spreading and/or pressing tool 30 is again removed from the inner space of the corrugated tube 20 so that the arrangement shown in FIG. 1, right hand representation, results.

The corrugated tube 20 is now secured against being pulled out by shape-match reception of the newly shaped first corrugation in the region of the recess 16, on the one hand, and by the named compression joint, on the other hand. A tight connection is provided in this manner together with the sealing or bonding fluid. The electrical contact resistance is low due to the metal contact. The electrical contact takes place reliably over the total periphery of the corrugations of the corrugated tube received in the bore 12 so that an effective protection from electromagnetic irradiation results (360° shielding).

The invention claimed is:

1. A method for the manufacture of a connection between a corrugated tube and a further body, wherein the further body has a bore with a bore diameter which is smaller than the outer diameter of the corrugated tube, with the method including the step of drawing or pressing the corrugated tube into the bore, a diameter reduction of the first corrugation of the corrugated tube cut at a crest point takes place before the drawing in or pressing in, and the diameter reduction takes place by lengthening the first corrugation of the corrugated tube.

2. A method in accordance with claim 1, wherein the diameter reduction takes place by cutting off the corrugated tube.

3. A method in accordance with claim 1, wherein the corrugated tube and/or the further body comprise metal.

4. A method in accordance with claim 3, wherein the pressing in of the corrugated tube takes place in that a spreading and/or pressing tool is inserted into the inner space of the corrugated tube; and a force acting in the direction of introduction is then exerted onto the spreading and/or pressing tool.

5. A method in accordance with claim 3, wherein a diameter reduction of the first corrugation of the corrugated tube cut at the crest point takes place before the drawing in or pressing in.

6. A method in accordance with claim 5, wherein the diameter reduction takes place by cutting off the corrugated tube.

7. A method in accordance with claim 5, wherein the diameter reduction takes place by lengthening the first corrugation of the corrugated tube.

8. A method in accordance with claim 7, wherein the diameter reduction takes place by cutting off the corrugated tube.

9. A method for the manufacture of a connection between a corrugated tube and a further body wherein the further body has a bore with a bore diameter which is smaller than the outer diameter of the corrugated tube, with the method including the step of drawing or pressing the corrugated tube into the bore;

the pressing in of the corrugated tube takes place in that a spreading and/or pressing tool is inserted into the inner space of the corrugated tube; and a force acting in the direction of introduction is then exerted onto the spreading and/or pressing tool.

10. A method in accordance with claim 9, wherein a diameter reduction of the first corrugation of the corrugated tube cut at a crest point takes place before the drawing in or pressing in.

11. A method in accordance with claim 10, wherein the diameter reduction takes place by cutting off the corrugated tube.

12. A method in accordance with claim 9, wherein a spreading or pressing tool is inserted such that the tool it is applied against an inner shoulder of the first non-deformed corrugation.

13. A method in accordance with claim 9, wherein the corrugated tube springs back elastically as soon as force is no longer exerted onto the spreading or pressing tool, whereby a friction locking connection results between the outer side of the corrugate tube and the inner wall of the bore.

14. A method in accordance with claim 9, wherein the connection between the corrugated tube and the further body is present over the total periphery of the corrugated tube so that a 360° shielding results.

15. A method for the manufacture of a connection between a corrugated tube and a further body, wherein the further body has a bore with a bore diameter which is smaller than the outer diameter of the corrugated tube, with the method including the step of drawing or pressing the corrugated tube into the bore;

the bore has a bore bottom; and an undercut is located in a circumferential region of the bore base, said undercut having a larger diameter than adjacent regions of the bore.

16. A method in accordance with claim 15, wherein a new corrugation is formed by the drawing in or pressing in of the corrugated tube in the end region of the corrugated tube, said new corrugation being received at least regionally in the undercut.

17. A method for the manufacture of a connection between a corrugated tube and a further body, wherein the further body has a bore with a bore diameter which is smaller than the outer diameter of the corrugated tube, with the method including the step of drawing or pressing the corrugated tube into the bore, and the corrugated tube is provided with a sealing and/or bonding fluid at least in its region receiving the bore and/or the inner bore wall is provided with a sealing and/or bonding fluid to achieve an improved sealing tightness and/or mechanical strength.

* * * * *